US009445612B2

(12) United States Patent
Nissen

(10) Patent No.: US 9,445,612 B2
(45) Date of Patent: *Sep. 20, 2016

(54) COMPRESSED CHEWING GUM TABLET

(71) Applicant: Vibeke Nissen, Fredericia (DK)

(72) Inventor: Vibeke Nissen, Fredericia (DK)

(73) Assignee: Gumlink A/S, Vejle (DK)

( * ) Notice: Subject to any disclaimer, the term of this patent is extended or adjusted under 35 U.S.C. 154(b) by 129 days.

This patent is subject to a terminal disclaimer.

(21) Appl. No.: 14/253,375

(22) Filed: Apr. 15, 2014

(65) Prior Publication Data

US 2014/0227388 A1    Aug. 14, 2014

Related U.S. Application Data

(63) Continuation of application No. 11/631,801, filed as application No. PCT/DK2004/000484 on Jul. 6, 2004, now Pat. No. 8,734,763.

(51) Int. Cl.
*A23G 4/08*   (2006.01)
*A23G 4/20*   (2006.01)
*A24B 15/16*  (2006.01)
*A24B 15/18*  (2006.01)
*A23G 4/06*   (2006.01)
*A23G 4/12*   (2006.01)
*A23L 1/00*   (2006.01)
*B30B 11/08*  (2006.01)

(52) U.S. Cl.
CPC .............. *A23G 4/20* (2013.01); *A23G 4/068* (2013.01); *A23G 4/08* (2013.01); *A23G 4/12* (2013.01); *A23L 1/0026* (2013.01); *A23L 1/0047* (2013.01); *A24B 15/16* (2013.01); *A24B 15/18* (2013.01); *B30B 11/085* (2013.01)

(58) Field of Classification Search
None
See application file for complete search history.

(56) References Cited

U.S. PATENT DOCUMENTS

| | | |
|---|---|---|
| 2,007,965 A | 7/1935 | Ellis |
| 2,353,927 A | 7/1944 | Pickett |
| 2,635,964 A | 4/1953 | Hewitt et al. |
| 3,262,784 A | 7/1966 | Bucher |
| 4,000,321 A | 12/1976 | Mochizuki et al. |
| 4,139,589 A | 2/1979 | Beringer et al. |
| 4,238,510 A * | 12/1980 | Cherukuri ............... A23G 3/343 426/5 |
| 4,525,363 A | 6/1985 | D'Amelia et al. |
| 4,731,435 A | 3/1988 | Greene et al. |
| 4,737,366 A | 4/1988 | Gergely et al. |
| 4,753,805 A | 6/1988 | Cherukuri et al. |
| 4,847,090 A | 7/1989 | Della Posta et al. |
| 4,971,806 A | 11/1990 | Cherukuri et al. |
| 5,017,385 A | 5/1991 | Wienecke |
| 5,087,459 A | 2/1992 | Chuu et al. |
| 5,354,556 A | 10/1994 | Sparks et al. |
| 5,487,902 A * | 1/1996 | Andersen .................. A23G 4/00 426/3 |
| 5,536,511 A | 7/1996 | Yatka |
| 5,545,415 A | 8/1996 | Tyrpin et al. |
| 5,711,961 A | 1/1998 | Reiner et al. |
| 5,866,179 A | 2/1999 | Testa |
| 6,200,608 B1 | 3/2001 | Gmunder et al. |
| 6,322,806 B1 | 11/2001 | Ream et al. |
| 6,344,222 B1 * | 2/2002 | Cherukuri ............ A61K 9/0058 424/440 |
| 6,599,542 B1 | 7/2003 | Abdel-Malik et al. |
| 2001/0002998 A1 | 6/2001 | Ream et al. |
| 2002/0071858 A1 * | 6/2002 | Luo ....................... A23G 4/06 424/440 |
| 2004/0068059 A1 | 4/2004 | Katayama et al. |
| 2005/0175733 A1 | 8/2005 | Thorengaard et al. |
| 2005/0220934 A1 | 10/2005 | Leadbeater et al. |
| 2006/0003050 A1 | 1/2006 | Nissen |
| 2006/0051455 A1 | 3/2006 | Andersen et al. |
| 2006/0115433 A1 | 6/2006 | Andersen et al. |
| 2006/0147580 A1 | 7/2006 | Nissen et al. |

FOREIGN PATENT DOCUMENTS

| | | | |
|---|---|---|---|
| CA | 2492145 A1 * | 1/2004 | ............... A23G 4/00 |
| DE | 2604791 A1 | 9/1976 | |
| DE | 2808160 A1 | 8/1979 | |
| DE | 3732677 A1 | 4/1989 | |
| DE | 19751330 A1 | 5/1999 | |
| EP | 0151344 A2 | 8/1985 | |
| EP | 0221850 A2 | 5/1987 | |
| EP | 0252000 A2 | 1/1988 | |
| EP | 0267160 A2 | 5/1988 | |
| EP | 0415656 A2 | 3/1991 | |
| EP | 1449525 A1 | 8/2004 | |
| EP | 1474993 A1 | 11/2004 | |

(Continued)

OTHER PUBLICATIONS

Grijpma, et al.; "(Co)Polymers of L-lactide, 1": Macromolecules Chem. Phys (1993): p. 1633-1647.

(Continued)

*Primary Examiner* — Frederick Krass
*Assistant Examiner* — Michael P Cohen
(74) *Attorney, Agent, or Firm* — St. Onge Steward Johnston and Reens, LLC

(57) ABSTRACT

A chewing gum tablet including at least two cohered chewing gum modules, the tableted chewing gum being formed by compression of chewing gum granules, at least one of the chewing gum modules including gum base granules, the gum base granules including an elastomer system, the chewing gum tablet including an elastomer system in an amount of at least 10% by weight of the tablet. A compressed chewing gum tablet has been obtained featuring extremely impressing abilities of incorporating well-defined amounts of chewing gum ingredients combined with acceptable rheological properties of the compete tablet.

16 Claims, 2 Drawing Sheets

(56) References Cited

FOREIGN PATENT DOCUMENTS

| | | | |
|---|---|---|---|
| GB | 1484832 A | 9/1977 | |
| JP | 4819550 B | 6/1973 | |
| JP | H0646760 A | 2/1994 | |
| JP | 2002538761 A | 11/2002 | |
| JP | 2005532801 T | 11/2005 | |
| WO | 9414331 A1 | 7/1994 | |
| WO | 0019977 A1 | 4/2000 | |
| WO | 0025598 A1 | 5/2000 | |
| WO | 0035296 A1 | 6/2000 | |
| WO | 0172139 A1 | 10/2001 | |
| WO | 02051258 A2 | 7/2002 | |
| WO | 02069729 A1 | 9/2002 | |
| WO | 02071860 A1 | 9/2002 | |
| WO | 02078459 A1 | 10/2002 | |
| WO | 2004004478 A1 | 1/2004 | |
| WO | 2004004479 A1 | 1/2004 | |
| WO | 2004004480 A1 | 1/2004 | |
| WO | 2004006686 A2 | 1/2004 | |
| WO | 2004068964 A1 | 8/2004 | |
| WO | 2004068965 A1 | 8/2004 | |
| WO | WO 2004068964 A1 * | 8/2004 | ............ A23G 3/004 |

OTHER PUBLICATIONS

Ching, et al.; "Biodegradable Polymers and Packaging" Biodegradable Polymers and Packaging (1993): p. 28-31.

Hunter, et al.; "Calcium Channel Blockers 1: A Review of Their Mechanisms of Action", Pharmacy International (Nov. 1985) pp. 267-271.

Food and Drug Administration, HHS § 172.615—Masticatory Substances, 2005; pp. 67-68.

Martindale, The Extra Pharmacopoeia 28th Ed., Reynolds, James E. F., Editor, the Pharmaceutical Press, London (1982).

Manly, et al.; "Substances Capable of Decreasing the Acid Solubility of Tooth Enamel"; J. Dent. Res.; vol. 28, No. 2; (1949) pp. 160-171.

US Code Federal Regulations, Title 21, vol. 3, Sec. 182.5013-182.8997 (Apr. 1, 2005).

* cited by examiner

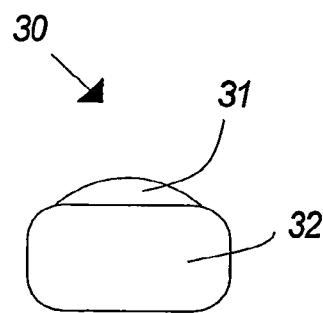
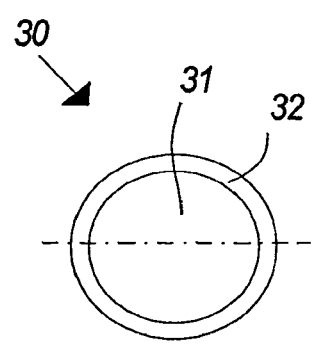
Fig.3a  Fig.3b
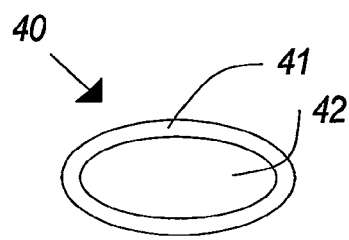
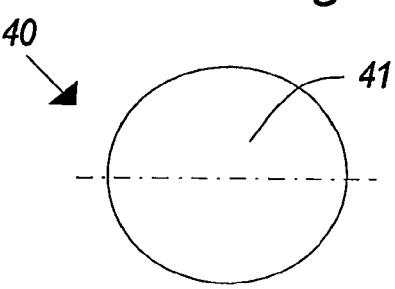
Fig.4a  Fig.4b
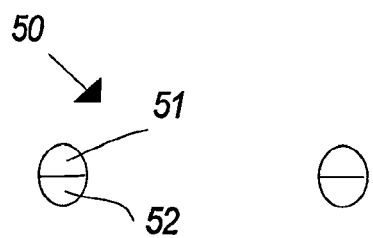
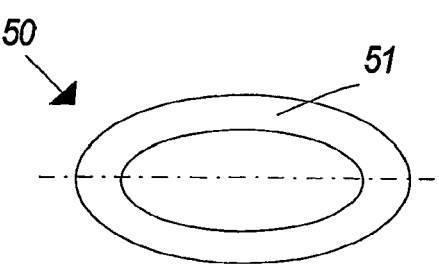
Fig.5a  Fig.5b

COMPRESSED CHEWING GUM TABLET

FIELD OF THE INVENTION

The present invention relates to a compressed chewing gum tablet.

BACKGROUND OF THE INVENTION

Various ways of producing chewing gum tablets are known within the art, both with respect to the applied basic ingredients and with respect to the methods by which the final chewing gum tablets are made.

Thus, conventional chewing gum may for example be prepared by initial preparation of a gum base by mixing of water-insoluble ingredients such as elastomers and resins, typically under pressure and raised temperature. Secondly, the chewing gum ingredients, typically the water-soluble ingredients and for example flavor are added to the gum base, again by mixing. The final tablet may then be provided by a simple forming of the final chewing gum mix into the desired chewing gum tablet forms, e.g. by a kind of compacting. The above-mentioned process may be performed on a continuous basis or on a batch basis.

Such type of chewing gum is typically preferred when addressing the broad consumer market, or large-scale production, among many reasons due to the very advantageous texture of the final product. Hence, for many years this method has broadly been preferred.

An example of such chewing gum is described in U.S. Pat. No. 4,847,090, in which at least one preprocessed string of final chewing gum mixture is laminated or gathered together with another layer of different compositional character.

Another method applied, which is basically very different than the above described, may broadly be described as an initial conventional mixing of the gum base, as above described followed by a granulation of the obtained gum base mix. The obtained gum base granules may then be mixed with further chewing gum ingredients, such as sweeteners and flavor. This final granules mix may then be compressed under high pressure (typically when applying cooling) into to a chewing gum tablet.

This type of chewing gum, tableted or compressed chewing gum, has been widely used especially within a segment of medical chewing gum due to the thereto-related relatively careful way of handling the chewing gum ingredients and especially the active ingredient typically being quite vulnerable to for example high temperatures.

The present invention deals with the last mentioned type of chewing gum, the compressed chewing gum.

Typically, as mentioned above, compressed chewing gum has been acknowledged as quite suitable for the use of vulnerable ingredients.

One problem of the above-mentioned compressed chewing gum is that the chewing gum may be relatively expensive in manufacture and moreover, if a further processing is desired, such as coating of the final tablet, the initially gained benefits may be somewhat lost due to increased manufacturing costs and even worse, due to the stress- and temperature invoked weakening of the tablet during coating.

A further problem of the above-mentioned compressed chewing gum is that undesired interaction between chewing gum ingredients restricts the possible variations and applications offered by the technique.

A chewing gum tablet of the above-described type is disclosed in DE 28 08 160. The disclosed chewing gum tablet is obtained by compression of a chewing granulate, and the tablet may be formed by several different layers of chewing granulates mixed with different ingredients, such as sweeteners or active ingredients. A problem of the disclosed tablet is that the requirements to the mixture of the different layers are somewhat strict in the sense that all the layers are made on the basis of chewing gum granules mixed with different ingredients. In other words, chewing gum granulates must be present in a substantial amount in each layer, thereby restricting the choice of ingredients and especially the possible concentrations.

It is an object of the invention to obtain a compressed chewing gum suffering from few or none of the above-mentioned disadvantages.

SUMMARY OF THE INVENTION

According to the invention it has been realized that even substantial differences in the characteristics of the different modules of the tablet may in fact be accepted, both with respect to manufacture and subsequently with respect to texture.

According to the invention, a compressed chewing gum tablet has been obtained featuring extremely advantageous abilities of incorporating well-defined amounts of chewing gum ingredients combined with acceptable rheological properties of the complete tablet.

It has surprisingly been realized that multi-module compressed chewing gum may not only be produced but also inherit more than acceptable texture and mouth-feel, when the different modules are chewed into one lump comprising a mix of the remains of the different modules.

This is especially interesting when applying modules having very different nature, e.g. chewing gum based modules and sweetener modules.

The invention relates to a chewing gum tablet 10, 20, 30, 40, 50 comprising at least two cohered chewing gum modules 11, 12; 21, 22, 23; 31, 32; 41, 42; 51, 52, said tableted chewing gum being formed by compression of chewing gum granules, at least one of said chewing gum modules comprising gum base granules, said gum base granules comprising an elastomer system, said chewing gum tablet comprising an elastomer system in an amount of at least 0.1 grams or at least 10% by weight of the chewing gum tablet.

When establishing the "backbone" of a multimodular tableted chewing gum it is realised according to the invention that this system primarily comprises the system of elastomer(s) and elastomer solvent(s) and that this system should comprise at least 0.1 grams or 10% by weight of the complete chewing gum, excluding optional outer coating. Thus, experiments have revealed that such multi-modular chewing gum has an improved initial chew.

Experiments have revealed that an improved texture and consistence may be obtained by increasing the effective absolute amount of elastomer(s) and elastomer solvent(s) in the complete chewing gum significantly. Thus, even a high percentage of gum base may under certain circumstances lack the intended resulting properties of the gum base.

Specifically, a chewing gum comprising a sufficient absolute amount chewing gum system of elastomer(s) and elastomer solvent(s) has shown attractive performance, especially in a context where a very large amount of non-chewing gum layers are applied.

Thus, experiments have shown that an improved initial chew-appearance may be obtained in addition to an initial acceptable tablet appearance.

As used herein the term "elastomer system" comprises the content of elastomers, elastomer plasticizers and resins in the gum base.

In an embodiment of the invention, said chewing gum tablet comprises an elastomer system in an amount of at least 15% by weight of the chewing gum tablet, preferably at least 20% by weight of the chewing gum tablet.

According to an embodiment of the invention, an improved performance may be obtained by applying not less than approximately 15% by weight of the tableted multi-modular chewing gum. It has moreover been realised than an increased amount of elastomer system results in an improved long-term release of flavour as a strong elastomer system tends to absorb a greater amount of flavour and release these ingredients on a more long term basis. In other words, initial release ingredient is delayed by incorporation into the gum base or elastomer system during the initial chew.

In an embodiment of the invention, the chewing gum tablet comprises an elastomer system in an amount of at least 25% by weight of the chewing gum tablet.

In an embodiment of the invention, the chewing gum tablet comprises an elastomer system in an amount of at least 15% by weight, preferably at least 30% by weight of an elastomer system containing module.

Experimental results have furthermore revealed that an increased amount of the elastomer system may facilitate an advantageous compression with respect to the obtainable texture. When applying a relatively low amount of elastomer system, i.e. below about 15% of the individual chewing gum module, difficulties arise in adjusting the hardness of the gum base-containing module. On the other hand, when applying an amount of at least 15% by weight of the gum base-containing module the desired texture may generally be expected as an increased amount of elastomer system makes the process of obtaining a desired texture less sensitive to the applied compression pressure.

In an embodiment of the invention, at least one chewing gum module comprises compressed fruit granules, compressed fruit, compressed fat, compressed liquorice or any combination thereof.

According to an embodiment of the invention, several unconventional chewing gum ingredients may be applied, as the process of gathering the modules into one tablet may be regarded as relatively uncorrelated compared to e.g. different coating methods requiring e.g. dispersion media or e.g. requirements with respect to the temperature. Such processes tend to interact with the existing structure in an undesired way, whereas the compression applied according to the invention may be regarded as substantially non-destructive, both with respect to the existing and the added structure.

In an embodiment of the invention, at least 10% by weight of the elastomer system comprises polyvinyl acetate, preferably at least 20% by weight of the elastomer system, and most preferably at least about 30% by weight of the elastomer system.

A problem to the use of ingredients such as chocolate, fat, fruit, etc. is that these ingredients tend to react with the chewing gum base during chewing and the dissolving or disintegration of the gum "backbone" may occur. According to an embodiment of the invention, wholly or partly dissolving of the chewing gum tablet may be counteracted by applying polyvinyl acetate (PVA) in a significant amount.

In an embodiment of the invention, the elastomer system comprises an elastomer portion and an elastomer solvent portion and wherein the amount of elastomer solvent is greater than the amount of elastomer.

An example of a suitable relation between the amount of elastomer and elastomer solvent may according to an embodiment of the invention be 1:2, i.e. one portion elastomer to two portions of elastomer solvents.

An elastomer is quite well-defined within the art, but for clarity reasons it should be noted that an elastomer solvent typically refers to e.g. a natural or synthetic resin.

In an embodiment of the invention, the chewing gum tablet comprises emulsifier.

According to an embodiment of the invention, emulsifiers may be applied for the purpose of softening the elastomer system for improvement of release of e.g. active ingredients from the gum base or elastomer system.

In an embodiment of the invention, the chewing gum tablet comprises emulsifier mixed with the elastomer system.

According to an embodiment of the invention, emulsifiers are in particular suitable for premixing with the elastomer system, e.g. the gum base, thereby obtaining improved textural properties of the gum base.

In an embodiment of the invention, the HLB value of the emulsifier is less than 10, preferably less than 7.

According to an embodiment of the invention, emulsifiers may be applied for the purpose of softening the elastomer system. On the other hand a relatively low HLB value may be preferred for some purposes, especially when dealing with relatively weak gum base formulations, e.g. a gum base having a low concentration of elastomer system.

In an embodiment of the invention, the chewing gum tablet 10, 20, 30, 40, 50 comprises a gum base content of at least 10% by weight, preferably at least 15% by weight of the tablet.

According to an embodiment of the invention, a gum base content of at least 10-15% by weight of the tablet in combination with the general requirements of the invention will provide the desired texture of the residual chewing gum.

In an embodiment of the invention, at least one of the chewing gum modules (11, 21, 31, 41) has a gum base content of less than 5% by weight.

In an embodiment of the invention, at least one of the chewing gum modules (11, 21, 31, 41) is substantially gum base free.

In an embodiment of the invention, said substantially gum base free chewing gum comprises sweetener as the major ingredient.

In a preferred embodiment of the invention at least one of said modules comprises sweetener in the amount of at least 50% by weight.

In a further preferred embodiment of the invention at least one of said modules comprises sweetener in the amount of at least 70% by weight, preferably at least 80% by weight.

In an embodiment of the invention the chewing gum module comprises sweetener as the major ingredient forms an encapsulation of the chewing gum tablet encapsulating the tablet completely or partly. In this way an alternative to conventional coating methods has been obtained thereby facilitating dry-coating.

In an embodiment of the invention, at least two of said chewing gum modules have different elasticity.

In an embodiment of the invention a multi-modular chewing gum tablet has been obtained featuring and allowing that the elasticity of different modules of the tablet may differ significantly.

In an embodiment of the invention, all the chewing gum modules are made by compression.

In an embodiment of the invention, the chewing gum modules are gathered by means of compression.

Thus, gathering of the chewing gum modules is in particular advantageous as such gathering may minimize interacting between the gathered structures.

In an embodiment of the invention, said chewing modules have different concentrations or compositions of gum base.

In an embodiment of the invention, said chewing gum module have different concentrations or compositions of chewing gum ingredients.

In an embodiment of the invention, said modules are tablet slice-like layers.

In an embodiment of the invention, different chewing gum modules comprise ingredients intended to be separated in the tablet.

In an embodiment of the invention, at least two of said chewing gum modules are separated by at least one separation layer.

In an embodiment of the invention, the thickness of at least one of said substantially gum base free layers exceeds at least the smallest width of the tablet divided by 20 (twenty).

In an embodiment of the invention, the thickness of at least one of said substantially gum base free layers exceeds 0.5 mm, preferably 0.7 mm.

In an embodiment of the invention, said modules have different shapes.

When applying different shapes of modules these may advantageously be formed in different compression steps.

In an embodiment of the invention, said chewing gum modules are manufactured on the basis of compressible chewing gum components.

In an embodiment of the invention, said chewing gum modules are manufactured on the basis of compressible chewing gum components, and wherein non-compressible components are added to the compressible chewing gum components.

In an embodiment of the invention, said chewing gum tablet is provided with a chewing gum coating.

In an embodiment of the invention, the average diameters of the gum base granules are in the range of 0.1 mm to 2.5 mm, and more preferred in the range of 0.5 mm to 1.6 mm.

In an embodiment of the invention, the average diameters of the chewing gum granules are in the range of 0.1 mm to 2.5, and more preferred in the range of 0.5 mm to 1.6 mm.

According to a preferred embodiment of the invention, a substantial amount of the chewing gum granules comprise sweetener such as bulk sweeteners, typically quite suitable for compression.

Furthermore, the invention relates to a method of tableting a chewing gum tablet according to the claims, whereby the elastomer system forms part of the gum base granules, and whereby said gum base granules are gathered by compression to other gum base granules or chewing gum granules.

According to a preferred embodiment of the invention, the elastomer system should be incorporated into the tableted chewing gum by compression of elastomer system-containing gum base granules.

In an embodiment of the invention the thickest chewing gum modules of the chewing gum tablet are compressed in a process step prior to compression of the other chewing gum modules.

According to an embodiment of the invention, the largest chewing gum module(s) is/are made as an initial compression step as the handling of the chewing gum module is made significantly easier when subsequently dealing with adding of further chewing gum layers.

In an embodiment of the invention the chewing gum modules are gathered by compression of the modules onto another.

In an embodiment of the invention at least one of the chewing gum modules are compressed when the chewing gum modules are gathered.

In an embodiment of the invention at least one of the chewing gum modules comprises active ingredients, thereby avoiding physical or chemical interaction between the chewing gum modules of the tablet.

In an embodiment of the invention the tableting is performed at a temperature of at least about 1° C.

According to an embodiment of the invention, multi-modular tableted chewing gums should preferably be tableted at a temperature of at least 1° C. as mutual gathering between the different modules tends to weaken when an acceptable process temperature has not been obtained. It should here be noted that gum base granules might very often be made while applying cooling.

BRIEF DESCRIPTION OF THE DRAWINGS

The invention will now be described with reference to the drawings of which

FIGS. 3a-3b illustrate a further two layer compressed tablet according to an embodiment of the invention, FIGS. 4a-4b illustrate a further two layer compressed tablet according to an embodiment of the invention, and where FIGS. 5a-5b illustrate a further two layer compressed tablet according to an embodiment of the invention.

DETAILED DESCRIPTION OF THE INVENTION

Compression of Chewing Gum Tablets

Figures 1A, 1B:
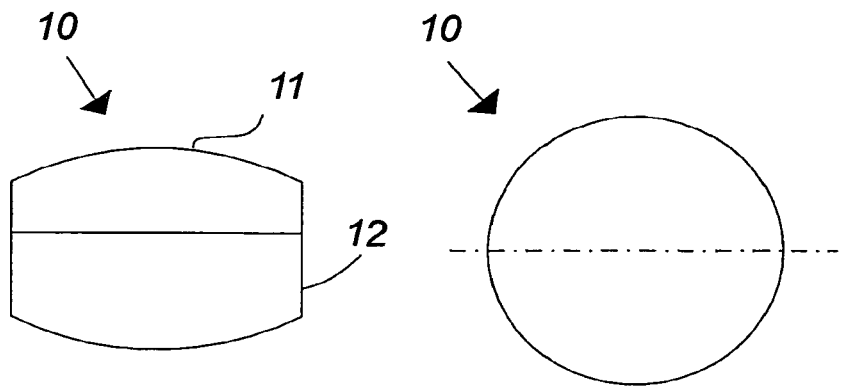
FIGS. 1a-1b illustrate a two-layer compressed tablet according to an embodiment of the invention.

Chewing gum tablets are typically manufactured by applying pressure to an amount of powder by suitable compression means. Suitable compression means will be disclosed and explained below. The powder is then compressed into a compact coherent tablet.

The powder may for example comprise so-called primary particles or aggregated primary particles, also referred to as granules. When these are compressed, bonds are established between the particles or granules, thereby conferring a certain mechanical strength to the compressed tablet.

It should be noted that the above-introduced terms: powder, primary particles and granules may be somewhat misleading in the sense that the difference between primary particles and granules may very often be looked upon differently depending on the background of the user. Some may for instance regard a sweetener, such as sorbitol, as a primary particle in spite of the fact that sorbitol due to the typically preprocessing performed on sorbitol when delivered to the customer should rather be regarded as some sort of granule. The definition adopted in the description of this invention is that granules refer to macro-particles comprising more or less preprocessed primary particles. It should, however, be noted that this adoption of terms only relates to the description of background prior art and is not mandatory for defining the scope of the invention.

When pressure is applied to the powder raw material, the bulk volume is reduced and the amount of air is decreased. During this process energy is consumed. As the particles come into closer proximity to each other during the volume reduction process, bonds may be established between the particles or granules. The formation of bonds is associated with a reduction in the energy of the system as energy is released.

Volume reduction takes place by various mechanisms and different types of bonds may be established between the particles or granules depending on the pressure applied and the properties of the particles or granules.

The first thing that happens when a powder is compressed is that the particles are rearranged under low compaction pressures to form a closer packing structure. Particles with a regular shape appear to undergo rearrangement more easily than those of irregular shape. As the pressure increases, further rearrangement is prevented and subsequent volume reduction is obtained by plastic and elastic deformation and/or fragmentation of the tablet particles. Brittle particles are likely to undergo fragmentation, i.e. breakage of the original particles into smaller units. Plastic deformation is an irreversible process resulting in a permanent change of particle shape, whereas the particles resume their original shape after elastic deformation. Evidently, both plastic and elastic deformation may occur, when compressing a chewing gum tablet.

Several studies of the bond types in compressed tablets have been made over the years, typically in the context of pharmaceuticals and several techniques of obtaining compressed tablets on the basis of available powders has been provided. Such studies have been quite focused on what happens when the volume reduction is performed and how the end-product may be optimized for the given purpose. Several refinements with respect to compressed tablets has for instance been made in the addition of for example binders in the tablet raw materials for the purpose of obtaining a sufficient strength to the final compressed tablet while maintaining acceptable properties, e.g. with respect to release.

Over the years, especially the pharmaceutical industry has gradually introduced chewing gum as a mean for obtaining release of active ingredients in the oral cavity.

Traditionally, the compression technique has been preferred by the pharmaceutical industry for the manufacturing of chewing gum. As indicated above, a problem related to the compression technique is that the nature of chewing gum granules is quite different to that of pure pharmaceutical conventional tablet powder. A further, and even more significant problem is that the required texture is basically completely different from that of a tablet intended for completely dissolving within the mouth of the user. Hence, this compression technique has been regarded as inferior with respect to the basic texture properties of therewith obtained chewing gum.

Over the last few years, however, the technique has rapidly improved especially with respect to development of gum base granulates intended for compression. Examples of such gum base granulate are described in the PCT/DK02/00461 and PCT/DK02/00462, hereby incorporated by reference.

According to the invention it has now been realized that a multi-modular chewing gum comprising a number of cohered chewing gum modules may in fact form a single piece of chewing gum having a more than acceptable texture, including the initial chew, irrespective of the fact that different modules exhibits very different properties with respect to plasticity and elasticity. Hence, even though it has be expected that for example chewing gum modules comprising sweetener, such as sorbitol as the sole or main component of that module would more or less disintegrate during the initial chew, very impressing results have been achieved.

Moreover, and again irrespective of the fact that different modules exhibit very different properties with respect to plasticity and elasticity, it has also been realized that a compressed chewing gum tablet comprising two different modules may in fact be made by compression. Hence, even though it should be expected that for example the elastic module(s) comprising gum base would affect the compression of the other layer(s) exhibiting very little elasticity, it has now been established that a final chewing gum tablet may in fact be made in one compression process and in one or several compression steps.

The gum base containing chewing modules according to the invention may typically be made on the basis of compressed gum base granulates.

The gum base granulates are made on the basis of a gum base. As used herein, the expression "gum base" refers in general to the water-insoluble part of the chewing gum, which typically constitutes 10 to 90% by weight including the range of 15-50% by weight of the total chewing gum formulation. Chewing gum base formulations typically comprise one or more elastomeric compounds, which may be of synthetic or natural origin, one or more resinous compounds, which may be of synthetic or natural origin, fillers, softening compounds, and minor amounts of miscellaneous ingredients such as antioxidants and colorants, etc.

The composition of chewing gum base formulations, which are admixed with chewing gum ingredients as defined below, can vary substantially depending on the particular product to be prepared and on the desired masticatory and other sensory characteristics of the final product. However, typical ranges (weight %) of the above gum base components are: 5 to 50% by weight elastomeric compounds, 5 to 55% by weight elastomer plasticizers, 0 to 50% by weight filler/texturiser, 5 to 35% by weight softener and 0 to 1% by weight of miscellaneous ingredients such as antioxidants, colorants, etc.

Gum base granulates may be manufactured according to conventional methods or e.g. those described in the PCT/DK02/00461 and PCT/DK02/00462, hereby incorporated by reference.

Chewing Gum Ingredients.

In the present context, chewing gum ingredients include bulk sweeteners, high intensity sweeteners, flavoring agents, softeners, emulsifiers, coloring agents, binding agents, acidulants, fillers, antioxidants and other components such as pharmaceutically or biologically active substances that confer desired properties to the finished chewing gum product.

Examples of suitable sweeteners are listed below.

Suitable bulk sweeteners include e.g. both sugar and non-sugar components. Bulk sweeteners typically constitute from about 5 to 95% by weight of the chewing gum, more typically about 20 to 80% by weight such as 30 to 60% by weight of the gum.

Useful sugar sweeteners are saccharide-containing components commonly known in the chewing gum art including, but not limited to, sucrose, dextrose, maltose, dextrins, trehalose, D-tagatose, dried invert sugar, fructose, levulose, galactose, corn syrup solids, and the like, alone or in combination.

Sorbitol can be used as a non-sugar sweetener. Other useful non-sugar sweeteners include, but are not limited to, other sugar alcohols such as mannitol, xylitol, hydrogenated starch hydrolysates, maltitol, isomalt, erythritol, lactitol and the like, alone or in combination.

High-intensity artificial sweetening agents can also be used alone or in combination with the above sweeteners. Preferred high-intensity sweeteners include, but are not limited to sucralose, aspartame, twinsweet, salts of acesulfame, alitame, saccharin and its salts, neotame, cyclamic acid and its salts, glycyrrhizin and salts thereof, dihydrochalcones, thaumatin, monellin, stevioside and the like, alone or in combination. In order to provide longer lasting sweetness and flavor perception, it may be desirable to encapsulate or otherwise control the release of at least a portion of the artificial sweetener. Likewise, encapsulation may be applied for the purpose of stabilizing the ingredients. Techniques such as wet granulation, wax granulation, spray drying, spray chilling, fluid bed coating, coascervation, encapsulation in yeast cells and fiber extrusion may be used to achieve the desired release characteristics. Encapsulation of sweetening agents can also be provided e.g. using another chewing gum component, such as a resinous compound, as the encapsulation agent.

Usage level of the artificial sweetener will vary considerably depending e.g. on factors such as potency of the sweetener, rate of release, desired sweetness of the product, level and type of flavor used and cost considerations. Thus, the active level of artificial sweetener may vary from about 0.01 to 8% by weight. When carriers used for encapsulation are included, the usage level of the encapsulated sweetener will be proportionally higher. Combinations of sugar and/or non-sugar sweeteners can be used in the chewing gum formulation processed in accordance with the invention. Additionally, the softener may also provide additional sweetness such as with aqueous sugar or alditol solutions.

If a low calorie gum is desired, a low calorie bulking agent can be used. Examples of low calorie bulking agents include polydextrose, Raftilose, Raftilin, Inuline, fructooligosaccharides (NutraFlora®), palatinose oligosaccharided; guar gum hydrolysates (e.g. Sun Fiber®) or indigestible dextrins (e.g. Fibersol®). However, other low calorie-bulking agents can be used.

Further chewing gum ingredients, which may be included in the chewing gum mixture processed in the present process, include surfactants and/or solubilisers, especially when pharmaceutically, cosmetically or biologically active ingredients are present. As examples of types of surfactants to be used as solubilisers in a chewing gum composition, according to the invention reference is made to H. P. Fiedler, Lexikon der Hilfsstoffe für Pharmacie, Kosmetik and Angrenzende Gebiete, pages 63-64 (1981) and the lists of approved food emulsifiers of the individual countries. Anionic, cationic, amphoteric or non-ionic solubilisers can be used. Suitable solubilisers include lecithins, polyoxyethylene stearate, polyoxyethylene sorbitan fatty acid esters, fatty acid salts, mono and diacetyl tartaric acid esters of mono and diglycerides of edible fatty acids, citric acid esters of mono and diglycerides of edible fatty acids, saccharose esters of fatty acids, polyglycerol esters of fatty acids, polyglycerol esters of interesterified castor oil acid (E476), sodium stearoyllatylate, sodium lauryl sulfate and sorbitan esters of fatty acids and polyoxyethylated hydrogenated castor oil (e.g. the product sold under the trade name CREMOPHOR), block copolymers of ethylene oxide and propylene oxide (e.g. products sold under trade names PLURONIC and POLOXAMER), polyoxyethylene fatty alcohol ethers, polyoxyethylene sorbitan fatty acid esters, sorbitan esters of fatty acids and polyoxyethylene steraric acid esters.

Particularly suitable solubilisers are polyoxyethylene stearates, such as for instance polyoxyethylene(8)stearate and polyoxyethylene(40)stearate, the polyoxyethylene sorbitan fatty acid esters sold under the trade name TWEEN, for instance TWEEN 20 (monolaurate), TWEEN 80 (monooleate), TWEEN 40 (monopalmitate), TWEEN 60 (monostearate) or TWEEN 65 (tristearate), mono and diacetyl tartaric acid esters of mono and diglycerides of edible fatty acids, citric acid esters of mono and diglycerides of edible fatty acids, sodium stearoyllactylate, sodium laurylsulfate, polyoxyethylated hydrogenated castor oil, blockcopolymers of ethylene oxide and propyleneoxide and polyoxyethylene fatty alcohol ether. The solubiliser may either be a single compound or a combination of several compounds. The expression "solubiliser" is used in the present text to describe both possibilities; the solubiliser used must be suitable for use in food and/or medicine.

In the presence of an active ingredient the chewing gum may preferably also comprise a carrier known in the art.

One significant advantage of the present process is that the temperature throughout the entire operation can be kept at a relatively low level. Thus, in an embodiment of the invention the tableting is performed at a temperature of at least about 1° C. Multi-modular tableted chewing gums should preferably be tableted at a temperature of at least 1° C. as mutual gathering between the different modules tends to weaken when lower temperatures are employed.

This is an advantageous feature with regard to preserving the aroma of added flavoring components, which may be prone to deterioration and/or evaporation at higher temperatures. Aroma agents and flavoring agents which are useful in a chewing gum produced by the present process are e.g. natural and synthetic flavorings (including natural flavorings) in the form of freeze-dried natural vegetable components, essential oils, essences, extracts, powders, including acids and other substances capable of affecting the taste profile. Examples of liquid and powdered flavorings include coconut, coffee, chocolate, vanilla, grape fruit, orange, lime, menthol, liquorice, caramel aroma, honey aroma, peanut, walnut, cashew, hazelnut, almonds, pineapple, strawberry, raspberry, tropical fruits, cherries, cinnamon, peppermint, wintergreen, spearmint, eucalyptus, and mint, fruit essence such as from apple, pear, peach, strawberry, apricot, raspberry, cherry, pineapple, and plum essence. The essential oils include peppermint, spearmint, menthol, eucalyptus, clove oil, bay oil, anise, thyme, cedar leaf oil, nutmeg, and oils of the fruits mentioned above.

In one preferred embodiment, the flavor is one or more natural flavoring agent(s) which is/are freeze-dried, preferably in the form of a powder, slices or pieces of combinations thereof. The particle size of such agent may be less than 3 mm, such as less than 2 mm, more preferred less than 1 mm, and calculated as the longest dimension of the particle. The natural flavoring agent may also be in a form where the particle size is from about 3 µm to 2 mm, such as from 4 µm to 1 mm. Preferred natural flavoring agents include seeds from a fruit e.g. from strawberry, blackberry and raspberry.

Various synthetic flavors, such as mixed fruit flavor may also be used according to the present invention. As indicated above, the aroma agent may be used in quantities smaller than those conventionally used. The aroma agents and/or flavors may be used in an amount from 0.01 to about 30% by weight of the final product depending on the desired intensity of the aroma and/or flavor used. Preferably, the content of aroma/flavor is in the range of from 0.2 to 3% by weight of the total composition.

According to the invention, encapsulated flavors or active ingredients, may be added to the final blend prior to compression.

Different methods of encapsulating flavors or active ingredients, which may both refer to flavors or active ingredients mixed into the gum base and flavors or active ingredients compressed into the chewing gum may e.g. include Spray drying, Spray cooling, Film coating, Coascervation, Double emulsion method (Extrusion technology) or Prilling.

Materials to be used for the above-mentioned encapsulation methods may e.g. include Gelatine, Wheat protein, Soya protein, Sodium caseinate, Caseine, Gum arabic, Mod. starch, Hydrolyzed starches (maltodextrines), Alginates, Pectin, Carregeenan, Xanthan gum, Locus bean gum, Chitosan, Bees wax, Candelilla wax, Carnauba wax, Hydrogenated vegetable oils, Zein and/or Sucrose.

Active ingredients may be added to the chewing gum. Preferably, these ingredients should be added subsequent to any significant heating or mixing. In other words, the active ingredients should preferably be added immediately prior to the compression of the final tablet.

Referring to the process, the adding of active ingredients may be cautiously blended with pre-mixed gum base granulates and further desired ingredients, immediately prior to the final compression of the tablet.

Examples of suitable active ingredients are listed below.

In one embodiment the chewing gum according to the invention comprises a pharmaceutically, cosmetically or biologically active substance. Examples of such active substances, a comprehensive list of which is found e.g. in WO 00/25598, which is incorporated herein by reference, include drugs, dietary supplements, antiseptic agents, pH adjusting agents, anti-smoking agents and substances for the care or treatment of the oral cavity and the teeth such as hydrogen peroxide and compounds capable of releasing urea during chewing. Examples of useful active substances in the form of antiseptics include salts and derivatives of guanidine and biguanidine (for instance chlorhexidine diacetate) and the following types of substances with limited water-solubility: quaternary ammonium compounds (e.g. ceramine, chloroxylenol, crystal violet, chloramine), aldehydes (e.g. paraformaldehyde), derivatives of dequaline, polynoxyline, phenols (e.g. thymol, p-chlorophenol, cresol), hexachlorophene, salicylic anilide compounds, triclosan, halogenes (iodine, iodophores, chloroamine, dichlorocyanuric acid salts), alcohols (3,4 dichlorobenzyl alcohol, benzyl alcohol, phenoxyethanol, phenylethanol), cf. also Martindale, The Extra Pharmacopoeia, 28th edition, pages 547-578; metal salts, complexes and compounds with limited water-solubility, such as aluminum salts, (for instance aluminum potassium sulphate AlK(SO$_4$)$_2$, 12H$_2$O) and salts, complexes and compounds of boron, barium, strontium, iron, calcium, zinc, (zinc acetate, zinc chloride, zinc gluconate), copper (copper chloride, copper sulphate), lead, silver, magnesium, sodium, potassium, lithium, molybdenum, vanadium should be included; other compositions for the care of mouth and teeth: for instance; salts, complexes and compounds containing fluorine (such as sodium fluoride, sodium monofluorophosphate, aminofluorides, stannous fluoride), phosphates, carbonates and selenium. Further active substances can be found in J. Dent. Res. Vol. 28 No. 2, pages 160-171, 1949.

Examples of active substances in the form of agents adjusting the pH in the oral cavity include: acids, such as adipic acid, succinic acid, fumaric acid, or salts thereof or salts of citric acid, tartaric acid, malic acid, acetic acid, lactic acid, phosphoric acid and glutaric acid and acceptable bases, such as carbonates, hydrogen carbonates, phosphates, sulphates or oxides of sodium, potassium, ammonium, magnesium or calcium, especially magnesium and calcium.

Active ingredients may comprise the below mentioned compounds or derivates thereof but are not limited thereto: Acetaminophen, Acetylsalicylic acid Buprenorphine Bromhexin Celcoxib Codeine, Diphenhydramin, Diclofenac, Etoricoxib, Ibuprofen, Indometacin, Ketoprofen, Lumiracoxib, Morphine, Naproxen, Oxycodon, Parecoxib, Piroxicam, Rofecoxib, Tenoxicam, Tramadol, Valdecoxib, Calciumcarbonate, Magaldrate, Disulfiram, Bupropion, Nicotine, Azithromycin, Clarithromycin, Clotrimazole, Erythromycin, Tetracycline, Granisetron, Ondansetron, Prometazin, Tropisetron, Brompheniramine, Ceterizine, leco-Ceterizine, Chlorcyclizine, Chlorpheniramin, Chlorpheniramin, Difenhydramine, Doxylamine, Fenofenadine, Guaifenesin, Loratidine, des-Loratidine, Phenyltoloxamine, Promethazin, Pyridamine, Terfenadin, Troxerutin, Methyldopa, Methylphenidate, Benzalcon. Chloride, Benzeth. Chloride, Cetylpyrid. Chloride, Chlorhexidine, Ecabet-sodium, Haloperidol, Allopurinol, Colchinine, Theophylline, Propanolol, Prednisolone, Prednisone, Fluoride, Urea, Actot, Glibenclamide, Glipizide, Metformin, Miglitol, Repaglinide, Rosiglitazone, Apomorfin, Cialis, Sildenafil, Vardenafil, Diphenoxylate, Simethicone, Cimetidine, Famotidine, Ranitidine, Ratinidine, cetrizin, Loratadine, Aspirin, Benzocaine, Dextrometorphan, Phenylpropanolamine, Pseudoephedrine, Cisapride, Domperidone, Metoclopramide, Acyclovir, Dioctylsulfosucc., Phenolphtalein, Almotriptan, Eletriptan, Ergotamine, Migea, Naratriptan, Rizatriptan, Sumatriptan, Zolmitriptan, Aluminum salts, Calcium salts, Ferro salts, Ag-salts, Zinc-salts, Amphotericin B, Chlorhexidine, Miconazole, Triamcinolonacetonid, Melatonine, Phenobarbitol, Caffeine, Benzodiazepiner, Hydroxyzine, Meprobamate, Phenothiazine, Buclizine, Brometazine, Cinnarizine, Cyclizine, Difenhydramine, Dimenhydrinate, Buflomedil, Amphetamine, Caffeine, Ephedrine, Orlistat, Phenylephedrine, Phenylpropanolamin, Pseudoephedrine, Sibutramin, Ketoconazole, Nitroglycerin, Nystatin, Progesterone, Testosterone, Vitamin B12, Vitamin C, Vitamin A, Vitamin D, Vitamin E, Pilocarpin, Aluminumaminoacetate, Cimetidine, Esomeprazole, Famotidine, Lansoprazole, Magnesiumoxide, Nizatide and or Ratinidine.

The invention is suitable for increased or accelerated release of active agents selected among the group of dietary supplements, oral and dental compositions, antiseptic agents, pH adjusting agents, anti-smoking agents, sweeteners, flavorings, aroma agents or drugs. Some of those will be described below.

The active agents to be used in connection with the present invention may be any substance desired to be released from the chewing gum. The active agents, for which a controlled and/or accelerated rate of release is desired, are primarily substances with a limited water-solubility, typically below 10 g/100 ml inclusive of substances which are totally water-insoluble. Examples are medicines, dietary supplements, oral compositions, anti-smoking agents, highly potent sweeteners, pH adjusting agents, flavorings etc.

Other active ingredients are, for instance, paracetamol, benzocaine, cinnarizine, menthol, carvone, caffeine, chlorhexidine-di-acetate, cyclizine hydrochloride, 1,8-cineol, nandrolone, miconazole, mystatine, sodium fluoride, nicotine, cetylpyridinium chloride, other quaternary ammonium compounds, vitamin E, vitamin A, vitamin D, glibenclamide or derivatives thereof, progesterone, acetyl-salicylic acid, dimenhydrinate, cyclizine, metronidazole, sodium hydrogen carbonate, the active components from ginkgo, the active components from propolis, the active components from *ginseng*, methadone, oil of peppermint, salicylamide, hydrocortisone or astemizole.

Examples of active agents in the form of dietary supplements are for instance salts and compounds having the nutritive effect of vitamin B2 (riboflavin), B12, folinic acid, folic acid, niacine, biotine, poorly soluble glycerophosphates, amino acids, the vitamins A, D, E and K, minerals in the form of salts, complexes and compounds containing calcium, phosphorus, magnesium, iron, zinc, copper, iodine, manganese, chromium, selenium, molybdenum, potassium, sodium or cobalt.

Furthermore, reference is made to lists of nutritionists accepted by the authorities in different countries such as for instance US code of Federal Regulations, Title 21, Section 182.5013.182 5997 and 182.8013-182.8997.

Examples of active agents in the form of compounds for the care or treatment of the oral cavity and the teeth are for instance bound hydrogen peroxide and compounds capable of releasing urea during chewing.

Examples of active agents in the form of antiseptics are for instance salts and compounds of guanidine and biguanidine (for instance chlorhexidine diacetate) and the following types of substances with limited water-solubility: quaternary ammonium compounds (for instance ceramine, chloroxylenol, crystal violet, chloramine), aldehydes (for instance paraformaldehyde), compounds of dequaline, polynoxyline, phenols (for instance thymol, para chlorophenol, cresol) hexachlorophene, salicylic anilide compounds, triclosan, halogenes (iodine, iodo-phores, chloroamine, dichlorocyanuric acid salts), alcohols (3,4 dichlorobenzyl alcohol, benzyl alcohol, phenoxyethanol, phenylethanol), cf. furthermore Martindale, The Extra Pharmacopoeia, 28th edition, pages 547-578; metal salts, complexes and compounds with limited water-solubility, such as aluminum salts, (for instance aluminum potassium sulphate $AlK(SO_4)_2, 12H_2O$) and furthermore salts, complexes and compounds of boron, barium, strontium, iron, calcium, zinc, (zinc acetate, zinc chloride, zinc gluconate), copper (copper chloride, copper sulfate), lead, silver, magnesium, sodium, potassium, lithium, molybdenum, vanadium should be included; other compositions for the care of mouth and teeth: for instance; salts, complexes and compounds containing fluorine (such as sodium fluoride, sodiummono-fluorophosphate, amino fluorides, stannous fluoride), phosphates, carbonates and selenium. Cf. furthermore J. Dent. Res. Vol. 28 No. 2, pages 160-171, 1949, wherein a wide range of tested compounds is mentioned.

Examples of active agents in the form of agents adjusting the pH in the oral cavity include for instance: acceptable acids, such as adipic acid, succinic acid, fumaric acid, or salts thereof or salts of citric acid, tartaric acid, malic acid, acetic acid, lactic acid, phosphoric acid and glutaric acid and acceptable bases, such as carbonates, hydrogen carbonates, phosphates, sulfates or oxides of sodium, potassium, ammonium, magnesium or calcium, especially magnesium and calcium.

Examples of active agents in the form of anti-smoking agents include for instance: nicotine, tobacco powder or silver salts, for instance silver acetate, silver carbonate and silver nitrate.

In a further embodiment, the sucrose fatty acid esters may also be utilized for increased release of sweeteners including for instance the so-called highly potent sweeteners, such as for instance saccharin, cyclamate, aspartame, thaumatin, dihydrocalcones, stevioside, glycyrrhizin or salts or compounds thereof. For increased released of sweetener, the sucrose fatty acids preferable have a content of palmitate of at least 40% such as at least 50%.

Further examples of active agents are medicines of any type.

Examples of active agents in the form of medicines include caffeine, salicylic acid, salicyl amide and related substances (acetylsalicylic acid, choline salicylate, magnesium salicylate, sodium salicylate), paracetamol, salts of pentazocine (pentazocine hydrochloride and pentazocinelactate), buprenorphine hydrochloride, codeine hydrochloride and codeine phosphate, morphine and morphine salts (hydrochloride, sulfate, tartrate), methadone hydrochloride, ketobemidone and salts of ketobemidone (hydrochloride), beta-blockers, (propranolol), calcium antagonists, verapamil hydrochloride, nifedinpine as well as suitable substances and salts thereof mentioned in Pharm. Int., November 85, pages 267-271, Barney H. Hunter and Robert L. Talbert, nitroglycerine, erythrityl tetranitrate, strychnine and salts thereof, lidocaine, tetracaine hydrochloride, etorphine hydrochloride, atropine, insulin, enzymes (for instance papain, trypsin, amyloglucosidase. glucoseoxidase, streptokinase, streptodomase, dextranase, alpha amylase), polypeptides (oxytocin, gonadorelin, (LH.RH), desmopressin acetate (DDAVP), isoxsuprine hydrochloride, ergotamine compounds, chloroquine (phosphate, sulfate), isosorbide, demoxytocin, heparin.

Other active ingredients include beta-lupeol, Letigen®, Sildenafil citrate and derivatives thereof.

Dental products include Carbamide, CPP Caseine Phospho Peptide; Chlorhexidine, Chlorhexidine di acetate, Chlorhexidine Chloride, Chlorhexidine di gluconate, Hexetedine, Strontium chloride, Potassium Chloride, Sodium bicarbonate, Sodium carbonate, Fluor containing ingredients, Fluorides, Sodium fluoride, Aluminum fluoride.

Ammonium fluoride, Calcium fluoride, Stannous fluoride, Other fluor containing ingredients Ammonium fluorosilicate, Potassium fluorosilicate, Sodium fluorosilicate, Ammonium monofluorphosphate, Calcium monofluorphosphate, Potassium monofluorphosphate, Sodium monofluorphosphate, Octadecentyl Ammonium fluoride, Stearyl Trihydroxyethyl Propylenediamine Dihydrofluoride, Vitamins include A, B1, B2, B6, B12, Folinic acid, Folic acid, niacin, Pantothenic acid, biotine, C, D, E, K. Minerals include Calcium, phosphorus, magnesium, iron, Zinc, Copper, Iodine, Manganese, Cromium, Selenium, and Molybdenum. Other active ingredients include: Q100, enzymes. Natural drugs including *Ginkgo Biloba*, ginger, and fish oil. The invention also relates to use of migraine drugs such as Serotonin antagonists: Sumatriptan, Zolmitriptan, Naratriptan, Rizatriptan, Eletriptan; nausea drugs such as Cyclizin, Cinnarizin, Dimenhydramin, Difenhydrinat; hay fever drugs such as Cetrizin, Loratidin, pain relief drugs such as Buprenorfin, Tramadol, oral disease drugs such as Miconazol, Amphotericin B, Triamcinolonaceton; and the drugs Cisaprid, Domperidon, Metoclopramide.

Above mentioned active ingredients and/or flavors may be pre-mixed into the gum base or of course added to the non- or low CG incorporated layer.

When the gum base granules comprises pre-mixed active ingredients, a controlled release of active ingredients may be obtained by means of at least a double active ingredients buffer. The first buffer comprising active ingredients blended into the final mix immediately prior to compression and the second buffer comprising active ingredients blended into the gum base prior to the blending of gum base and gum base ingredients.

In accordance with the invention, the chewing gum element comprises about 0 to about 75% by weight of an outer coating applied onto the chewing gum center. In the present context, a suitable outer coating is any coating that results in extended storage stability of the compressed chewing gum products as defined above, relative to a chewing gum of the same composition that is not coated. Thus, suitable coating types include hard coatings, film coatings and soft coatings of any composition including those currently used in coating of chewing gum, pharmaceutical products and confectioneries.

According to a preferred embodiment of the invention, film coating is applied to the compressed chewing gum tablet.

One presently preferred outer coating type is a hard coating, which term is used in the conventional meaning of that term including sugar coatings and sugar-free (or sugarless) coatings and combinations thereof. The object of hard coating is to obtain a sweet, crunchy layer and to protect the gum centers for various reasons as. In a typical process of providing the chewing gum centers with a protective sugar coating the gum centers are successively treated in suitable coating equipment with aqueous solutions of crystallisable sugar such as sucrose or dextrose, which, depending on the stage of coating reached, may contain other functional ingredients, e.g. fillers, colors, etc. In the present context, the sugar coating may contain further functional or active compounds including flavor compounds, pharmaceutically active compounds and/or polymer degrading substances.

In the production of chewing gum it may, however, be preferred to replace the cariogenic sugar compounds in the coating by other, preferably crystallisable, sweetening compounds that do not have a cariogenic effect. In the art such coatings are generally referred to as sugarless or sugar-free coatings. Presently preferred non-cariogenic hard coating substances include polyols, e.g. sorbitol, maltitol, mannitol, xylitol, erythritol, lactitol, isomalt and tagatose which are obtained by industrial methods by hydrogenation of D-glucose, maltose, fructose or levulose, xylose, erythrose, lactose, isomaltulose and D-galactose, respectively.

In a typical hard coating process, as it will be described in details in the following, syrup containing crystallisable sugar and/or polyol is applied onto the gum centers and the water it contains is evaporated off by blowing with warm, dry air. This cycle must be repeated several times, typically 10 to 80 times, in order to reach the swelling required. The term "swelling" refers to the increase in weight of the products, as considered at the end of the coating operation by comparison with the beginning, and in relation to the final weight of the coated products. In accordance with the present invention, the coating layer constitutes for example about 0 to 75% by weight of the finished chewing gum element, such as about 10 to 60% by weight, including about 15 to 50% by weight.

In further useful embodiments the outer coating of the chewing gum element of the invention is an element that is subjected to a film coating process and which therefore comprises one or more film-forming polymeric agents and optionally one or more auxiliary compounds, e.g. plasticizers, pigments and opacifiers. A film coating is a thin polymer-based coating applied to a chewing gum center of any of the above forms. The thickness of such a coating is usually between 20 and 100 µm. Generally, the film coating is obtained by passing the chewing gum centers through a spray zone with atomized droplets of the coating materials in a suitable aqueous or organic solvent vehicle, after which the material adhering to the gum centers is dried before the next portion of coating is received. This cycle is repeated until the coating is complete.

In the present context, suitable film-coating polymers include edible cellulose derivatives such as cellulose ethers including methylcellulose (MC), hydroxyethyl cellulose (HEC), hydroxypropyl cellulose (HPC) and hydroxypropyl methylcellulose (HPMC). Other useful film-coating agents are acrylic polymers and copolyiners, e.g. methylacrylate aminoester copolymer or mixtures of cellulose derivatives and acrylic polymers. A particular group of film-coating polymers also referred to as functional polymers are polymers that, in addition to its film-forming characteristics, confer a modified release performance with respect to active components of the chewing gum formulation. Such release modifying polymers include methylacrylate ester copolymers, ethylcellulose (EC) and enteric polymers designed to resist the acidic stomach environment, yet dissolve readily in the duodenum. The latter group of polymers includes: cellulose acetate phthalate (CAP), polyvinyl acetate phthalate (PVAP), shellac, metacrylic acid copolymers, cellulose acetate trimellitate (CAT) and HPMC. It will be appreciated that the outer film coating according to the present invention may comprise any combination of the above film-coating polymers.

In other embodiments, the film-coating layer of the chewing gum elements according to the invention comprises a plasticizing agent having the capacity to alter the physical properties of a polymer to render it more useful in performing its function as a film-forming material. In general, the effect of plasticizers will be to make the polymer softer and more pliable as the plasticizer molecules interpose themselves between the individual polymer strands thus breaking down polymer-polymer interactions. Most plasticizers used in film coating are either amorphous or have very little crystallinity. In the present context, suitable plasticizers include polyols such as glycerol, propylene glycol, polyethylene glycol, e.g. the 200-6000 grades hereof, organic esters such as phthalate esters, dibutyl sebacate, citrate esters and triacetin, oils/glycerides including castor oil, acetylated monoglycerides and fractionated coconut oil.

The choice of film-forming polymer(s) and plasticizing agent(s) for an optional outer coating of the present chewing gum element is made with due consideration for achieving the best possible barrier properties of the coating in respect of dissolution and diffusion across the film of moisture and gasses.

The film coating of the chewing gum elements may also contain one or more colorants or opacifiers. In addition to providing a desired color hue, such agents may contribute to protecting the compressed gum base against pre-chewing reactions, in particular by forming a barrier against moisture and gasses. Suitable colorants/pacifiers include organic dyes and their lakes, inorganic coloring agents, e.g. titanium oxide and natural colors such as e.g. β-carotene.

Additionally, film coatings may contain one or several auxiliary substances such as flavors and waxes or saccharide compounds such as polydextrose, dextrins including maltodextrin, lactose, modified starch, a protein such as gelatine or zein, a vegetable gum and any combination thereof.

An advantage of film or hard coating may be that it is transparent, and thus the layers of a multi-layered tablet according to the invention are visible, thereby making the tablet look attractive and tempting.

It is also an aspect of the present invention that the outer coating of the chewing gum element can contain one or more pharmaceutically or cosmetically components including those mentioned hereinbefore.

Accordingly, in further embodiments, a above hard-coated or film-coated chewing gum element of the invention is an element where the outer coating comprises at least one additive component selected from a binding agent, a moisture absorbing component, a film forming agent, a dispersing agent, an antisticking component, a bulking agent, a flavoring agent, a coloring agent, a pharmaceutically or cosmetically active component, a lipid component, a wax component, a sugar and an acid. If it is desired to defer the effect of any of these additive components in the outer coating until mastication of the chewing gum, such components may, in accordance with the invention be encapsulated using any conventional encapsulation agent such as e.g. a protein including gelatine and soy protein, a cellulose derivative including any of those mentioned above, a starch derivative, edible synthetic polymers and lipid substances, the latter optionally in the form of liposome encapsulation.

In other embodiments, the chewing gum element according to the invention is provided with an outer coating in the form generally described in the art as a soft coating. Such soft coatings are applied using conventional methods and may advantageously consist of a mixture of a sugar or any of the above non-cariogenic, sugar-less sweetening compounds, and a starch hydrolysate.

Again, it should be noted that the above-described coating is optional or that it may be postponed until it fits into the last part of the manufacturing process due to the fact that the applied barrier layer is also acting as a complete or at least a partial barrier to transfer of humidity from the environment into the tablet.

Generally with respect to the gum base formulations applicable within the scope of the invention, useful synthetic elastomers include, but are not limited to, synthetic elastomers listed in Food and Drug Administration, CFR, Title 21, Section 172,615, the Masticatory Substances, Synthetic) such as polyisobutylene. e.g. having a gas pressure chromatography (GPC) average molecular weight in the range of about 10,000 to 1,000,000 including the range of 50,000 to 80,000, isobutylene-isoprene copolymer (butyl elastomer), styrene-butadiene copolymers e.g. having styrene-butadiene ratios of about 1:3 to 3:1, polyvinyl acetate (PVA), e.g. having a GPC average molecular weight in the range of 2,000 to 90,000 such as the range of 3,000 to 80,000 including the range of 30,000 to 50,000, where the higher molecular weight polyvinyl acetates are typically used in bubble gum base, polyisoprene, polyethylene, vinyl acetate-vinyl laurate copolymer e.g. having a vinyl laurate content of about 5 to 50% by weight such as 10 to 45% by weight of the copolymer, and combinations hereof.

It is common in the industry to combine in a gum base a synthetic elastomer having a high molecular weight and a low molecular weight elastomer. Presently preferred combinations of synthetic elastomers include, but are not limited to, polyisobutylene and styrene-butadiene, polyisobutylene and polyisoprene, polyisobutylene and isobutylene-isoprene copolymer (butyl rubber) and a combination of polyisobutylene, styrene-butadiene copolymer and isobutylene isoprene copolymer, and all of the above individual synthetic polymers in admixture with polyvinyl acetate, vinyl acetate-vinyl laurate copolymers, respectively and mixtures thereof. Particularly interesting elastomeric or resinous polymer compounds which advantageously can be used in a process according to the invention include polymers which, in contrast to currently used elastomers and resins, can be degraded physically, chemically or enzymatically in the environment after use of the chewing gum, thereby giving rise to less environmental pollution than chewing gums based on non-degradable polymers, as the used degradable chewing gum remnants will eventually disintegrate and/or can be removed more readily by physical or chemical means from the site where it has been dumped.

In accordance with the invention, the chewing gum base components, which are used herein, may include one or more resinous compounds contributing to obtain the desired masticatory properties and acting as plasticizers for the elastomers of the gum base composition. In the present context, useful elastomer plasticizers include, but are not limited to, natural rosin esters, often referred to as ester gums including as examples glycerol esters of partially hydrogenated rosins, glycerol esters of polymerised rosins, glycerol esters of partially dimerised rosins, glycerol esters of tally oil rosins, pentaerythritol esters of partially hydrogenated rosins, methyl esters of rosins, partially hydrogenated methyl esters of rosins and pentaerythritol esters of rosins. Other useful resinous compounds include synthetic resins such as terpene resins derived from alpha-pinene, beta-pinene, and/or d-limonene, natural terpene resins; and any suitable combinations of the foregoing. The choice of elastomer plasticizers will vary depending on the specific application, and on the type of elastomer(s) being used.

A chewing gum base formulation may, if desired, include one or more fillers/texturisers including as examples, magnesium and calcium carbonate, sodium sulphate, ground limestone, silicate compounds such as magnesium and aluminum silicate, kaolin and clay, aluminum oxide, silicium oxide, talc, titanium oxide, mono-, di- and and tri-calcium phosphates, cellulose polymers, such as wood, and combinations thereof.

The fillers/texturisers may also include natural organic fibers such as fruit vegetable fibers, grain, rice, cellulose and combinations thereof.

A gum base formulation may, in accordance with the present invention comprise one or more softeners e.g. sucrose polyesters including those disclosed in WO 00/25598, which is incorporated herein by reference, tallow, hydrogenated fat including tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof. As used herein the term "softener" designates an ingredient, which softens the gum base or chewing gum formulation and encompasses waxes, fats, oils, emulsifiers, surfactants and solubilisers.

To soften the gum base further and to provide it with water binding properties, which confer to the gum base a pleasant smooth surface and reduce its adhesive properties, one or more emulsifiers is/are usually added to the composition, typically in an amount of 0 to 18% by weight, preferably 0 to 12% by weight of the gum base. Mono- and diglycerides of edible fatty acids, lactic acid esters and acetic acid esters of mono and diglycerides of edible fatty acids, acetylated mono and diglycerides, sugar esters of edible fatty acids, Na-, K-, Mg- and Ca-stearates, lecithin, hydroxylated lecithin and the like are examples of conventionally used emulsifiers which can be added to the chewing gum base. In case of the presence of a biologically or pharmaceutically active ingredient as defined below, the formulation may comprise certain specific emulsifiers and/or solubilisers in order to enhance dispersion and release of the active ingredient.

Waxes and fats are conventionally used for the adjustment of the consistency and for softening of the chewing gum base when preparing chewing gum bases. In connection with the present invention, any conventionally used and suitable type of wax and fat may be used, such as for instance rice bran wax, polyethylene wax, petroleum wax (refined paraffin and microcrystalline wax), paraffin, beeswax, carnauba wax, candelilla wax, cocoa butter, degreased cocoa powder and any suitable oil or fat, as e.g. completely or partially hydrogenated vegetable oils or completely or partially hydrogenated animal fats.

Furthermore, the gum base formulation may, in accordance with the present invention, comprise colorants and whiteners such as FD&C-type dyes and lakes, fruit and vegetable extracts, titanium dioxide and combinations thereof. Further useful chewing gum base components include antioxidants, e.g. butylated hydroxytoluene (BHT), butyl hydroxyanisol (BHA), propylgallate and tocopherols, and preservatives.

FIG. 1 a illustrates a cross-section of a compressed multi modular chewing gum tablet according the invention and illustrated in FIG. 1 b.

The illustrated chewing gum tablet 10 comprises two chewing gum modules 11 and 12.

According to the illustrated embodiment, each module is simply comprised by a layer. The multi-module tablet may in this embodiment be regarded as a two-layer chewing gum tablet 10.

The illustrated chewing gum tablet 10 may for example weigh approximately 1.5 gram and comprise a non-GB chewing gum module 11 and a GB-containing module 12. The gum base is in the present context referred to as "GB".

The illustrated non-GB chewing gum module 11 weighs approximately 0.2 gram and the gum base-containing module 12 weighs approximately 1.3 gram.

The illustrated tablet has an approximate diameter of 16 mm and a thickness at the thickest point in the center of approximately 7 mm.

Chewing gum module 12, here forming the gum base carrying part of the chewing gum, the gum base comprises
 a 16% premix (comprising 12% menthol and 88% gum base),
 57.4% sorbitol powder,
 1% beads,
 0.15% aspartame,
 0.15% acesulfame,
 1.3% peppermint powder and
 24% gum base.
The gum base may for example comprise
 elastomer: 19% by weight
 natural resin: 20% by weight
 synthetic resin: 20% by weight
 fat/fillers: 26% by weight
 wax: 15% by weight
Chewing gum module 11 comprises
 85% sorbitol
 3% menthol powder,
 2% eucalyptus powder
 10% liquorice powder.

The two modules 11 and 12 are adhered to each other. Different processes may be applied for the purpose. However, according to a preferred embodiment of the invention, the mutual adhering between the two layers is obtained by the compression of one module 11 onto the other 12.

According to an embodiment of the invention, the illustrated chewing gum tablet 10 may be provided with a coating, e.g. a film coating.

It should be noted that various concentrations of gum base in the different modules (here: layers) may be applied within the scope of the invention. Moreover, it should be noted that according to a preferred embodiment of the invention, the non-GB incorporated chewing gum layer should be substantially free of any gum base, i.e. as described above.

The non-GB (or low portion GB) incorporated modules may for instance comprise compressible chewing gum ingredients, for example sweeteners and flavors, more or less pre-processed for the purpose of facilitating a true compression. If, the non- or low GB-incorporated layer(s) has to include non-compressible ingredients, these may e.g. be incorporated in compressible materials or processed by known techniques.

Other optional ingredients to be emphasized here may e.g. comprise pharmaceutical ingredients.

In other applications, e.g. for the purpose of establishing different release profiles the different modules may comprise different amounts (i.e. concentrations) of gum base.

The tablet may moreover comprise (not shown) one or several barrier layers adapted for establishment of a barrier between inter-reacting ingredients, such as certain acids and flavors.

Figures 2A, 2B:
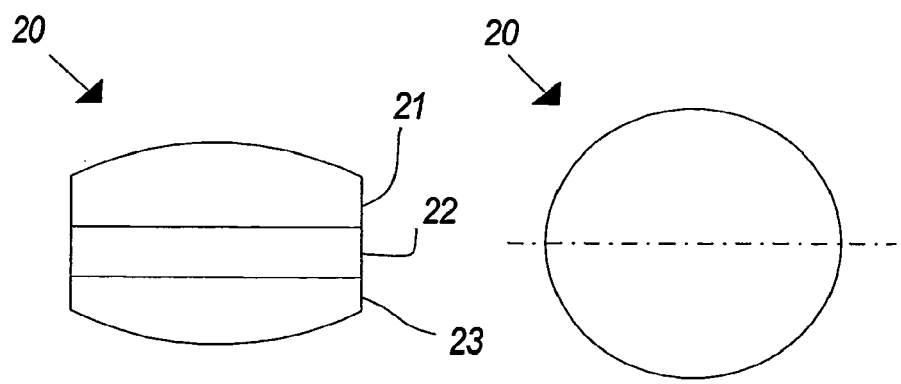
FIGS. 2a-2b illustrate a three layer compressed tablet according to an embodiment of the invention.

FIG. 2 a illustrates a cross-section of a compressed multi modular chewing gum tablet according to the invention and illustrated in FIG. 2 b from above.

The illustrated embodiment 20 comprises a three-module chewing gum of which the lowest layer 23 comprises a gum base incorporated chewing gum module having a certain gum base concentration, the intermediate layer 22 comprises a gum base incorporated chewing gum module of a gum base concentration differing from that of module 23 and the last module 21 comprises a substantially gum base-free chewing gum module.

The non-GB incorporated chewing gum module 23 may for example comprise compressed chewing gum ingredients, such as sweeteners, flavor, freeze-dried fruit, fat, etc. or a layer 11 as described in FIG. 1 a.

The two GB-containing modules 22 and 23 may for example comprise different concentrations of gum base, e.g. for the purpose of providing a variation, especially of the post release, whereas the module 21 primarily determines the initial release of the tablet when chewed.

FIG. 3 a illustrates a cross-section of a compressed multi modular chewing gum tablet 30 according to the invention and illustrated in FIG. 3 b from above.

The illustrated chewing gum tablet 30 comprises a gum base incorporated chewing gum module 32 upon which a non-GB incorporated chewing gum base is arranged.

FIG. 4 a illustrates a cross-section of a further compressed multi-modular chewing gum tablet 40 according to the invention and illustrated in FIG. 4 b from above.

The tablet 40 differs somewhat from the other described tablets in the sense that the tablet comprises a compressed GB-incorporated chewing gum module 42 forming a gum center. The module 42 is encapsulated by a surrounding substantially non-GB incorporated module 41.

FIG. 5 a illustrates a cross-section of a compressed multi-modular chewing gum tablet 50 according to the invention and illustrated in FIG. 5 b from above.

According to the illustrated embodiment, showing a ring-formed two layer tablet 50, a base chewing gum module 52 comprises a certain concentration of gum base, whereas the other layer comprises a non-GB comprising module 51.

Alternatively, the chewing gum module 51 may comprise a gum base content differing from that of the chewing gum module 52, thereby facilitating a chewing gum providing at least two different release profiles in one piece.

The Tablet

The size of the tablet and individual tablets may vary significantly from tablet to tablet.

An example of a tablet (1.1 gram) may thus be 17 mm×7 mm×8 mm.

Another size and shape may be a round tablet (1.5 gram) having a diameter of 16 mm, a thickness of 7.1 mm in the center a circumpheral thickness of approximately 4.1 mm The tablets and the modules may have many different shapes. The preferred shape is the shape illustrated in FIGS. 1 *a* and 1 *b*, i.e. a slice-like module. The modular shape is preferred due to the fact that it is relatively easy to handle and process. However, other module shapes may of course be applied within the scope of the invention.

Moreover, a multi-modular tablet according to the invention, may also comprise three or even further modules.

A few of those are illustrated in FIGS. 3 *a*, 4 *a* and 4 *a*.

Further Examples

Different examples of multi-modular tablets were provided. Initially the tablets were evaluated on the basis of the amount of gum base in the tablet. Then, the tablets were examined on the basis of the elastomer system.

The multi-modular tableted chewing gum of the below examples comprises a two layer chewing gum made by means of compression. The complete two layer tablet weigh 3 grams and the tablet is film coated. The two-layer chewing gum comprises two modules, one gum base containing module of 1.5 grams and one gum base-free module of 1.5 grams.

The gum base-containing module according to examples 1-3 comprises
  5% gum base.
  93.4% sorbitol powder,
  0.15% aspartame,
  0.15% acesulfame, and
  1.3% peppermint powder The gum base-containing module according to examples 4-6 comprises
  10% gum base.
  88.4% sorbitol powder,
  5% aspartame,
  0.15% acesulfame, and
  1.3% peppermint powder The gum base-containing module according to examples 7-9 comprises 20% gum base.
  78.4% sorbitol powder,
  0.15% aspartame,
  0.15% acesulfame, and
  1.3% peppermint powder The gum base-containing module according to examples 10-12 comprises
  30% gum base.
  68.4% sorbitol powder,
  0.15% aspartame,
  0.15% acesulfame, and
  1.3% peppermint powder The gum base-containing module according to examples 13-15 comprises
  40% gum base.
  58.4% sorbitol powder,
  5% aspartame,
  0.15% acesulfame, and
  1.3% peppermint powder The gum base-containing module according to examples 16-18 comprises
  50% gum base.
  48.4% sorbitol powder,
  0.15% aspartame,
  0.15% acesulfame, and
  1.3% peppermint powder The gum bases of examples 2, 5, 8, 11, 14 and 17 comprise
  elastomer: 14% by weight
  natural resin: 18% by weight
  synthetic resin: 18% by weight
  fat/fillers: 32.5% by weight
  wax: 14% by weight
  menthol: 3% by weight
  aspartame: 0.5% by weight The gum bases of examples 1, 4, 7, 10, 13 and 16 comprise
  elastomer: 8.4% by weight
  natural resin: 10.8% by weight
  synthetic resin: 10.8% by weight
  fat/fillers: 52.5% by weight
  wax: 14% by weight
  menthol: 3% by weight
  aspartame: 0.5% by weight The gum bases of examples 3, 6, 9, 12, 15 and 18 comprise
  elastomer: 19.6% by weight
  natural resin: 25.2% by weight
  synthetic resin: 25.2% by weight
  fat/fillers: 12.5% by weight
  wax: 14% by weight
  menthol: 3% by weight
  aspartame: 0.5% by weight The gum base-free module comprises
  85% sorbitol
  3% menthol powder,
  2% eucalyptus powder
  10% liquorice powder The tableted chewing gums of example 1 to 18 are compressed by the following process.

The gum base preparation comprises the steps of adding the ingredients elastomer, natural resin, synthetic resin, fat/filler, wax, menthol, and aspartame into a mixing kettle and mechanically mixing during heating. The temperature is lowered and the gum base is granulated in a granulator to prepare gum base-containing granules with average diameters in the range of 0.5 mm to 1.3 mm.

The gum base-containing granules are mixed with the chewing gum ingredients sorbitol (available from CERESTAR Scandinavia A/S, Denmark), aspartame (available from ZHUN YONGXINRONG BIOCHEMICAL PRODUCTS CO., LTD, China), acesulfame (Sunett, particle size A, available from Nutrinova GmbH, Germany) and peppermint powder (available from I. P. Callisons-Sons). The hereby mixed gum base-containing composition is tableted in a tableting machine.

The tablets of the present examples are produced on a Fette 3090 tableting machine equipped with two stations (available from Fette GmbH, Germany). The moulds have circular cross sections with diameters of 16 mm and hollowings to provide tablets, which are concave or curved.

The gum base-containing granules forming the first layer is feed into the mould of the tableting machine and pre-compressed with a force of 2 kN to give a pre-compressed first layer with thickness of approximately 3.5 mm.

The gum base-free layer is feed into the mould of the tableting machine onto the first pre-compressed layer as a homogenous mixture of sorbitol powder, menthol powder, eucalyptus powder, and liquorice powder to form a second layer.

The first and second layers are then compressed with a force of 13 kN to form the layered tablet.

Alternatively, the process disclosed and explained in GB 1 484 832 may be applied, hereby incorporated by reference with respect to the compression method.

As regards the granulation process, the gum base-containing granules may be granulated in a granulator A5 PAC 6, available from GALA GmbH, Germany as described in European patent application no. 03388031.1.

An evaluation is made of the above described examples and the results are plotted in the below table 1 and 2. The evaluation is quantized into Not Acceptable=Nac, Acceptable=Acc, Ok=OK.

It is noted that all the evaluated chewing gums have an acceptable tablet appearance in the sense that the prepared tablet is mechanically stable. It is moreover noted that tablet texture is acceptable when applying an elastomer system in approximately 10% by weight of the complete tablet, in this case about 0.3 gram of elastomer system. It is furthermore noted that the texture improves further when reaching an amount of approximately 15% by weight of the chewing gum tablet.

A further and preferred multi-modular tableted chewing gum is provided in the below examples 19-36. Basically, the gum base and chewing gum formulations examples 19-36 corresponds exactly examples 1-18. However, now the tablet weight has been reduced and the relation between the to layers of the tablet has been modified. This modification is explained below.

Now, the chewing gum tablet comprises a two-layer chewing gum tablet made by means of compression. The complete two layer tablet weigh 1.3 grams and the tablet is film coated. The two-layer chewing gum comprises two modules, one gum base containing module of about 0.9 gram and one gum base-free module of about 0.4 gram. The evaluation is plotted in the below tables 3 and 4.

It is again noted that all the evaluated chewing gums have an acceptable tablet appearance in the sense that the prepared tablet is mechanically stable. It is moreover noted that tablet texture is acceptable when applying an elastomer system in approximately 10% by weight of the complete tablet, in this case about 0.1 gram of elastomer system. It is furthermore noted that the texture improves further when reaching an amount of approximately 15% by weight of the chewing gum tablet, here about 0.2 gram of the evaluated tablet.

TABLE 1

A 3 gram two-layer tablet

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| GB content (GB module) | 5% | 5% | 5% | 10% | 10% | 10% | 20% | 20% | 20% |
| Elastomer system % (total) | 1.5 | 2.5 | 3.5 | 3.0 | 5 | 7 | 6 | 10 | 14 |
| Elastomer system grams (total) | 0.05 | 0.08 | 0.11 | 0.09 | 0.15 | 0.21 | 0.18 | 0.30 | 0.42 |
| Tablet appearance | Ok | Ok | Ok | Ok | Ok | Ok | Ok | Ok | Ok |
| Tablet Texture | Nac | Nac | Nac | Nac | Nac | Nac | Nac | Acc | Acc |

TABLE 2

A 3 gram two-layer tablet

|  | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|
| GB content (GB module) | 30% | 30% | 30% | 40% | 40% | 40% | 50% | 50% | 50% |
| Elastomer system % (total) | 9 | 15 | 21 | 12 | 20 | 28 | 15 | 25 | 35 |
| Elastomer system grams (total) | 0.27 | 0.45 | 0.63 | 0.36 | 0.60 | 0.84 | 0.45 | 0.75 | 1.05 |
| Tablet appearance | Ok | Ok | Ok | Ok | Ok | Ok | Ok | Ok | Ok |
| Tablet texture | Nac | Acc | Ok | Ok | Ok | Ok | Ok | Ok | Ok |

TABLE 3

A 1.3 gram two-layer tablet

|  | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|
| GB content (GB module) | 5% | 5% | 5% | 10% | 10% | 10% | 20% | 20% | 20% |
| Elastomer system % (total) | 1.5 | 2.5 | 3.5 | 3.0 | 5 | 7 | 6 | 10 | 14 |
| Elastomer system grams (total) | 0.02 | 0.03 | 0.05 | 0.04 | 0.07 | 0.09 | 0.08 | 0.13 | 0.18 |
| Tablet appearance | Ok | Ok | Ok | Ok | Ok | Ok | Ok | Ok | Ok |
| Tablet texture | Nac | Nac | Nac | Nac | Nac | Nac | Nac | Acc | Acc |

TABLE 4

| A 1.3 gram two-layer tablet | | | | | | | | | |
|---|---|---|---|---|---|---|---|---|---|
| | Ex. 28 | Ex. 29 | Ex. 30 | Ex. 31 | Ex. 32 | Ex. 33 | Ex. 34 | Ex. 35 | Ex. 36 |
| GB content (GB module) | 30% | 30% | 30% | 40% | 40% | 40% | 50% | 50% | 50% |
| Elastomer system % (total) | 9 | 15 | 21 | 12 | 20 | 28 | 15 | 25 | 35 |
| Elastomer system grams (total) | 0.12 | 0.20 | 0.27 | 0.16 | 0.26 | 0.36 | 0.20 | 0.33 | 0.46 |
| Tablet appearance | Ok | Ok | Ok | Ok | Ok | Ok | Ok | Ok | Ok |
| Tablet texture | Acc | Ok | Ok | Acc | Ok | Ok | Ok | Ok | Ok |

What is claimed is:

1. A chewing gum tablet comprising:
   at least two cohered chewing gum modules;
   said chewing gum tablet being formed by compression of chewing gum granules;
   at least one of said chewing gum modules comprising gum base granules, said gum base granules comprising an elastomer system;
   said chewing gum tablet comprising the elastomer system in an amount of at least 15% by weight of the chewing gum tablet, and
   wherein at least 10% by weight of the elastomer system comprises polyvinyl acetate.

2. The chewing gum tablet of claim 1, wherein said chewing gum tablet comprises the elastomer system in an amount of at least 25% by weight of the chewing gum tablet.

3. The chewing gum tablet of claim 1, wherein at least one of the chewing gum modules comprises at least one of chocolate, fat and fruit.

4. The chewing gum tablet of claim 1, wherein at least one of the chewing gum modules has a gum base content of less than 5% by weight.

5. The chewing gum tablet of claim 1, wherein at least one of the chewing gum modules is gum base free.

6. The chewing gum tablet of claim 5, wherein the gum base free chewing gum module comprises sweetener its major ingredient.

7. The chewing gum tablet of claim 1, wherein all of the chewing gum modules are made by compression.

8. The chewing gum tablet of claim 1, wherein each of the chewing gum modules have different concentrations or compositions of gum base.

9. The chewing gum tablet of claim 1, wherein the chewing gum modules are tablet layers.

10. The chewing gum tablet of claim 1, wherein different chewing gum modules comprise ingredients which are separated in the tablet.

11. The chewing gum tablet of claim 1, wherein said chewing gum tablet is provided with a chewing gum coating.

12. The chewing gum tablet of claim 1, further comprising nicotine.

13. The chewing gum tablet of claim 1, further comprising tobacco powder.

14. The chewing gum tablet of claim 1, wherein at least one of the chewing gum modules comprises active ingredients.

15. A chewing gum tablet comprising:
    at least two cohered chewing gum modules;
    said chewing gum tablet being formed by compression of chewing gum granules;
    at least one of said chewing gum modules comprising gum base granules, said gum base granules comprising an elastomer system;
    said chewing gum tablet comprising the elastomer system in an amount of at least 15% by weight of the chewing gum tablet;
    wherein at least 10% by weight of the elastomer system comprises polyvinyl acetate; and
    wherein the elastomer system is present in an amount sufficient to provide a more mechanically stable tablet as compared to a chewing gum tablet having an elastomer system present in an amount of less than 15% by weight of the chewing gum tablet.

16. A chewing gum tablet comprising:
    at least two cohered chewing gum modules;
    said chewing gum tablet being formed by compression of chewing gum granules;
    at least one of said chewing gum modules comprising gum base granules, said gum base granules comprising an elastomer system;
    said chewing gum tablet comprising the elastomer system in an amount of at least 15% by weight of the chewing gum tablet,
    wherein the at least one of said chewing gum modules comprising gum base granules comprises at least 15% by weight of the elastomer system and
    wherein at least 10% by weight of the elastomer system comprises polyvinyl acetate.

* * * * *